Figure 1:
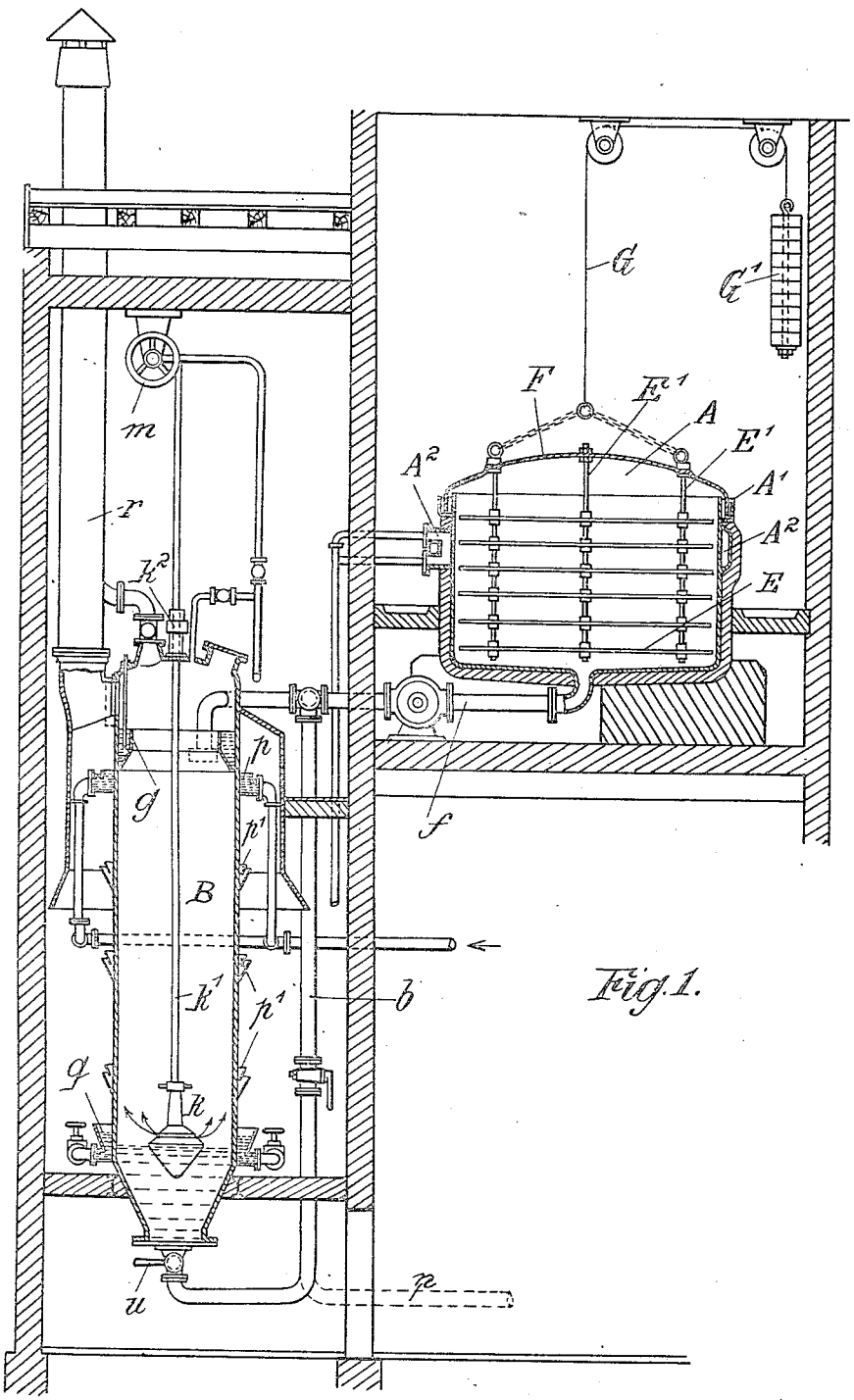

L. NATHAN.
APPARATUS FOR COOLING AND ROUSING BEER WORT AND FOR PRECIPITATING SLUDGE FROM SAME.
APPLICATION FILED JULY 7, 1914.

1,235,231.

Patented July 31, 1917.

Witnesses:
George Du Bon
Louis Alexander

Inventor
Leopold Nathan
By Bresser Knauth
Attorneys

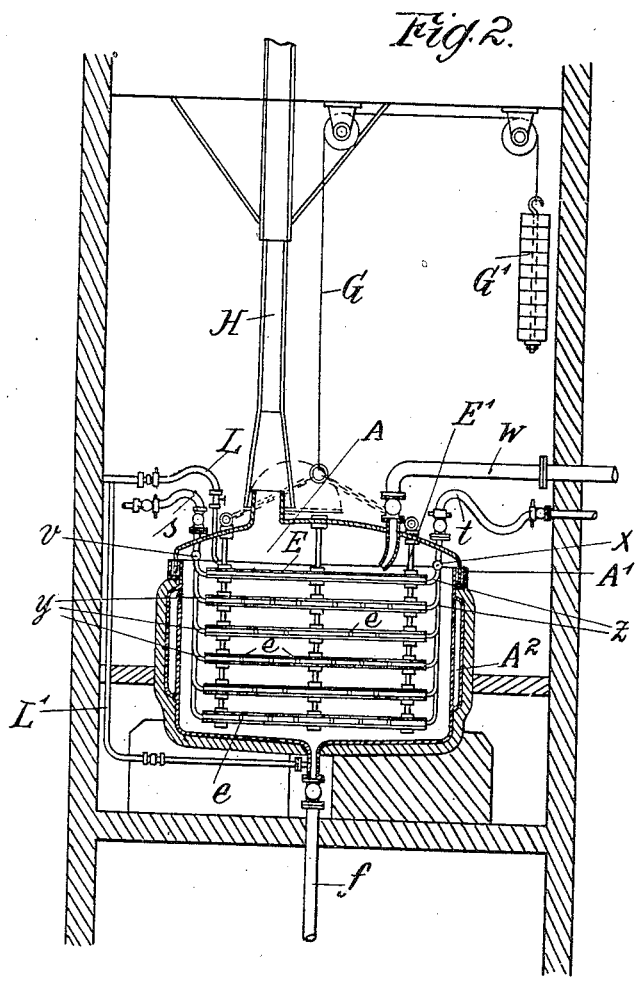

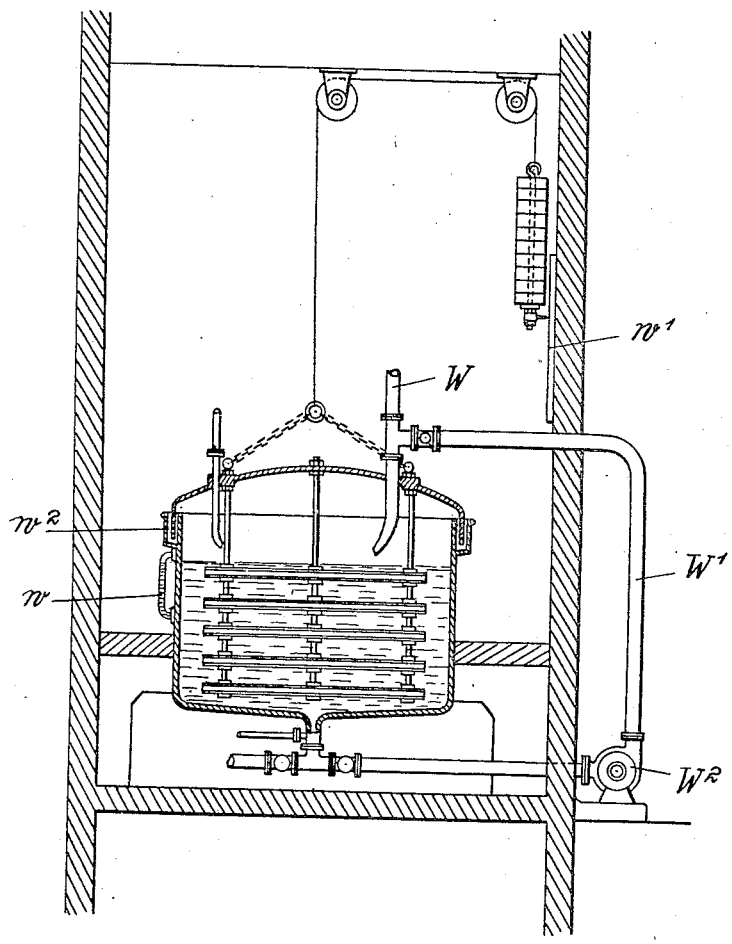

UNITED STATES PATENT OFFICE.

LEOPOLD NATHAN, OF ZURICH, SWITZERLAND.

APPARATUS FOR COOLING AND ROUSING BEER-WORT AND FOR PRECIPITATING SLUDGE FROM SAME.

1,235,231.　　　　Specification of Letters Patent.　　Patented July 31, 1917.

Application filed July 7, 1914. Serial No. 849,391.

*To all whom it may concern:*

Be it known that I, LEOPOLD NATHAN, a citizen of the German Empire and resident of Zurich, Alpenstrasse 7, Switzerland, have invented new and useful Improvements in Apparatus for Cooling and Rousing Beer-Wort and for Precipitating Sludge from Same, of which the following is a specification.

In the brewing of beer, especially in breweries in which special stress is laid on the production of high-class beers, the cooler is still in almost general use for cooling down the worts. The cooler, however, constitutes the primary and worst source of infection in the preparation of beer. Owing to the very rapid cooling of the wort in the cooler, germs which have settled down on the cooler before it is charged with wort are not all killed. Moreover, fresh germs make their appearance during the cooling process, and these are not killed, especially at temperatures from 60° downward.

In spite of these defects of the cooler, it has been impossible hitherto, owing to its valuable properties for certain special types of beer, to dispense with this appliance. In addition to the cooling effect produced in the cooler, vapors are eliminated which carry off with them unpleasant odors formed in consequence of the inevitable access of air. Through the access of air and simultaneous cooling, considerable quantities of proteid substances and hop resins are precipitated, and the only way in which these can be separated from the liquid is by allowing them to settle down, for which purpose the extensive surface of the cooler is highly advantageous.

The method employed by me in connection with the apparatus of the present invention consists in the first place in freeing the wort from the said aromatic and flavoring substances by the passage of a current of air or carbon dioxid, or both. If, as was hitherto the case, in this treatment the gas be forced or drawn into the wort from below, a very strong frothing is produced, which prevents the complete removal of the vapors. The operation is directed, in the first place, to preventing this frothing or to nullifying its ill effects. With this object, the gas is carried, in a powerful current, along the wort in a finely-divided state so as to carry off the vapors from the surface of the liquid. At the same time a cooling effect is also produced; nevertheless the essential portion of the elimination effect can only be accomplished fully by treating the hot wort with a current of gas. The complete deposition of the cooler sludge, occurring as cooling progresses, is facilitated in a special manner, and the possibility of carrying it out in a closed, sterile vessel is afforded, by setting up in said vessel a frame containing a large number of superimposed stages having a total superficial area corresponding to that of the cooler. In order to remove the sludge this staged frame must be taken out of the vessel. The resulting infection is neutralized by allowing the next charge of wort to run into the vessel in a sufficiently hot condition.

This operation can be carried out in two vessels: one for the elimination treatment and one for the deposition of the sludge; or one and the same vessel may be used for both purposes.

When two sets of apparatus are used, the cooling is mainly effected in the first apparatus, while the sludge separated out thereby is flushed over with the liquid into the second, or settling apparatus.

In operation the wort is first of all run off quickly into the settling vessel, which at this stage serves merely as a collector, and thus enables the wort to be removed from the tun quickly, a point of great importance in the case of many kinds of beer. From this settling apparatus the wort flows down at suitable velocity on the inner side of a hollow vessel which is cooled from the outside. The operation in this vessel is two fold in character. Sterilized air or carbon dioxid is forced into the vessel in a direction opposite to that of the descending hot liquid, thus carrying off into the open air the vapors given off by the liquid. In particular, the device is arranged in such a way, preferably by means of a float, that the flow of air begins on the surface of the gradually accumulating liquid, and thus effects the elimination of the vapors and also the cooling of the descending wort.

The introduction of the gas above the liquid is necessary because, if passed through the liquid, it causes the latter to froth up considerably, which froth also prevents the complete removal of the vapors. Moreover, the use of exhaust pumps is dispensed with, since in this manner the vapors can be expelled directly into the open air.

When this cooler is fully charged, the wort is left standing in same until the desired reduction in temperature has been effected by the cooling of the surface from outside. This can also be facilitated by simultaneously forcing in carbon dioxid from the bottom of the vessel. This has the additional advantage of carrying off at the same time the surplus air dissolved in the wort. When the wort has been cooled sufficiently, it is then forced into the settling vessel, along with all the sediment which has separated out in the meantime. The deposition of this sediment then proceeds in this specially constructed settling apparatus.

This settling apparatus consists of a vessel, fitted with an air-tight cover, and having a staged frame arranged therein. The total superficial area of these stages, which are arranged one above another at a short distance apart, corresponds with that of the bottom of the usual cooler; and when the sludge settles down on the frame it can be lifted out of the vessel and simply swilled clean.

If it be desired to utilize the settling apparatus for eliminating air and for cooling, the stages of the frame are constructed in the form of hollow shells, through which a cooling liquid may be passed. The vessel is also provided with a gas intake and exhaust pipe, and with means for allowing the wort to run down, in a finely-divided condition, so as to meet the flow of gas.

Accordingly, the operation may be carried out in three ways. In the first, the hot wort can be run direct into the air-eliminating and cooling vessel, and afterward into the settling vessel, in which case the temperature must be regulated in such a way that it will be sufficiently high to sterilize the settling vessel, or else other measures must be taken to sterilize the vessel.

In the second form, the hot wort is first run into the settling vessel, in order to sterilize the latter, and is then transferred to the air-eliminating and cooling vessel, to be afterward returned to the settling vessel once more, the cooling operation being mostly distributed between the two vessels, but mainly in the first one.

Thirdly, the air-elimination, cooling and deposition can be effected in a single vessel.

My invention will be better understood by referring to the accompanying drawings in which Figure 1 represents an elevation, principally in section, showing one form of apparatus according to my invention; Fig. 2 is a similar view showing a modified form of the apparatus; and Fig. 3 is a similar view showing still a third form of apparatus according to my invention.

Before describing my invention in detail I may state that the settling apparatus also presents, *per se*, considerable advantages over the usual cooler, even when working under sterile conditions is not required.

The aluminium settling vessel A is connected, by pipes $b$, $n$, and $f$, on the one hand with the cooling vessel B and on the other hand with the tun. The vessel A is provided with an attachment E, also of aluminium, which consists of a large number of horizontal plates, which are connected to the cover F and can be easily lifted out of the surrounding vessel by means of the rope G and counterweight G'. A tight joint between the vessel A and its cover F is insured by means of a water seal A'.

The separate horizontal plates E may be hollow, in order to enable a supplementary cooling to be effected. In such case, the rods E', connecting the plates together, are in part formed as tubes through which the cooling liquid flows. A special external cooling device $A^2$ may also be provided.

The vessel A is connected with the cooling vessel B by means of the pipe $f$ and a cock. In the upper portion of this cooling vessel is arranged a circular channel $g$ over the edge of which the incoming wort trickles down uniformly over the walls of the vessel. Any other device for distributing the liquid uniformly over the whole surface may also be used.

The descending liquid collects at the bottom of the vessel B, and is acted upon, during its descent, by the air issuing from the mouth $k$ of a float. This float is suspended from a flexible pipe $k'$ which passes through a stuffing box $k^2$ and is wound on a roller $m$. The escaping air carries off the vapors and escapes through the flue $r$ into the ambient atmosphere.

The cooling vessel B is cooled externally by water in the known manner, by allowing cooling water, from a feed pipe, to flow through a distributing channel $p$ on to the outer surface of the vessel, the rate of flow being impeded by means, for example, of collecting channels $p'$, the water being finally collected in the channel $q$. In this way the descending wort is cooled from the inside and outside of the vessel B, the vapors being eliminated and the sludge separated out at the same time. According to circumstances, the accumulating liquid may have attained the desired temperature by the time the cooling vessel B is full; but if not, it is left until such temperature has been attained, whereupon it is drawn off to the settling vessel A through the cock $u$ and pipes $b$, $f$.

While the liquid is standing, carbon dioxid can be introduced from below into the vessel B, through the cock $u$.

Fig. 2 illustrates a single apparatus in which the whole series of operations can be performed.

The vessel is arranged in a manner similar to the settling vessel already described. The hot wort, however, enters through the pipe W into the top of the vessel, and, in consequence of the special shape of the admission pipe, is distributed as a thin layer on the uppermost plate or stage. The admission of air or carbon dioxid is effected, through the pipe L, opposite to the wort delivery pipe, the gas being delivered in consequence of the special shape and disposition of the supply pipe, in a suitably distributed manner, to meet the layer of wort distributed over the top plate. The mixture of gas and wort vapors is led away into the open air through the pipe H.

The plates E are made hollow, for the purpose of cooling the wort by means of a cooling liquid circulating through them. In order to enable the wort to be cooled uniformly in the vessel, each plate is provided with its own intake and outlet Y, Z. These separate pipes open into distributing and collecting pipes V and X, in such a manner that a uniform circulation of cooling water is maintained inside the plates. The mains S and T supply cooling liquid to, and carry it away from, the vessel.

The rods E′ serve to carry and space the plates.

The cooling may also be effected or supplemented by a cooling jacket A², and also by the supply of air or carbon dioxid gas through the pipe L′. The air or carbon dioxid ascends through the orifices $e$ provided in the plates, thus producing a circulation of the liquid to be cooled.

Fig. 3 illustrates a variation of the apparatus, in which the whole series of operations can be performed. It is generally constructed in the same way as the apparatus shown in Fig. 2 with exception of the following features. The admission pipe W is connected with the delivery pipe by a pipe W¹ and a pump W². Hereby the liquid may be circulated in the vessel and the elimination of gases, the cooling and the separation of sludge is promoted.

Further there is a means provided to regulate the position of the topmost cooled plate E in a manner that it is only immersed very little below the surface of the liquid, in order to secure the perfect cooling of the liquid above the topmost plate.

For this purpose a water gage or equivalent device $w$ is provided and a scale $w^1$, whereby the lid of the vessel A and the plates E fixed to it may be lowered into the right position with respect to the liquid level.

The water seal $w^2$ must be high enough to allow of such regulation.

Now what I claim and desire to secure by Letters Patent is the following:

1. In apparatus of the class described, in combination, a receptacle for receiving the hot wort provided with cooling surfaces, means for flowing the wort over said surfaces, and means for passing a current of air over the exposed surface of the wort, said cooling surfaces being removably arranged so as to enable the sludge to be washed therefrom.

2. In apparatus of the class described, in combination, a receptacle for receiving the hot wort, means for forming the wort in a thin sheet as it enters the receptacle, and means for cooling said sheets, means for passing a current of air over the exposed surface of said sheets, said cooling surfaces being removably arranged so as to enable the sludge to be washed therefrom.

3. In apparatus of the class described, in combination, a closed receptacle for receiving the hot wort, a plurality of plates arranged within the receptacle and adapted to have the wort flowed over some of them in thin sheets, and means for cooling the plates.

4. In apparatus of the class described, in combination, a closed receptacle for receiving the hot wort, a plurality of plates arranged within the receptacle and adapted to have the wort flowed over some of them in thin sheets, means for cooling the plates and means for passing a current of air over the exposed surface of the wort.

5. In apparatus of the class described, in combination, a closed receptacle for receiving the hot wort, a plurality of plates connected together and removably arranged within the receptacle and adapted to have the wort flowed over some of them in thin sheets, means for cooling the plates and means for passing a current of air over the exposed surface of the wort.

6. In apparatus of the class described, in combination, a closed receptacle for receiving the hot wort, a plurality of spaced horizontal hollow plates removably suspended within the receptacle, means for circulating a cooling liquid through said plates, means for flowing the wort over some of said plates in thin sheets and means for passing a current of air over the top surface of the top plate.

7. In apparatus of the class described, in combination, a closed receptacle for receiving the hot wort, a plurality of spaced horizontal plates removably suspended within the receptacle adapted to have the wort flowed over some of them in thin sheets, means for cooling the plates, means for passing a current of air over the exposed surface of the wort, and means for regulating the position of the top plate with reference to the level of the wort within the receptacle.

That I claim the foregoing as my invention, I have signed my name in presence of two witnesses, this twenty third day of June 1914.

LEOPOLD NATHAN.

Witnesses:
August Gille,
Ernst Bommblurst.